(12) United States Patent
El-Zein (10) Patent No.: US 8,439,784 B2
(45) Date of Patent: May 14, 2013

(54) BRAKING SYSTEM

(75) Inventor: Ali El-Zein, London (GB)

(73) Assignee: Technology from Ideas, Limited, Waterford (IE)

( * ) Notice: Subject to any disclaimer, the term of this patent is extended or adjusted under 35 U.S.C. 154(b) by 422 days.

(21) Appl. No.: 12/676,425

(22) PCT Filed: Sep. 3, 2008

(86) PCT No.: PCT/EP2008/061643
§ 371 (c)(1),
(2), (4) Date: Apr. 14, 2010

(87) PCT Pub. No.: WO2009/030712
PCT Pub. Date: Mar. 12, 2009

(65) Prior Publication Data
US 2011/0130236 A1    Jun. 2, 2011

(30) Foreign Application Priority Data
Sep. 4, 2007 (EP) .................................. 07115671

(51) Int. Cl.
*F16H 47/04* (2006.01)
*F16D 31/04* (2006.01)
*F16D 31/08* (2006.01)
*F16D 57/06* (2006.01)

(52) U.S. Cl.
USPC ........................................ 475/104; 475/331

(58) Field of Classification Search .................. 475/89, 475/91, 93, 104, 105, 107, 108
See application file for complete search history.

(56) References Cited

U.S. PATENT DOCUMENTS

| | | | | |
|---|---|---|---|---|
| 1,368,476 | A * | 2/1921 | Bovee | 475/105 |
| 2,371,228 | A * | 3/1945 | Dodge | 475/108 |
| 2,758,573 | A | 8/1956 | Krozal | |
| 2,933,158 | A | 4/1960 | Pitts | |
| 3,802,813 | A * | 4/1974 | Butler | 418/165 |
| 5,078,246 | A | 1/1992 | Rohs et al. | |
| 5,558,187 | A | 9/1996 | Aberle | |
| 7,025,700 | B1 * | 4/2006 | Hoelscher | 475/89 |
| 8,152,673 | B2 * | 4/2012 | Yanay | 475/93 |

FOREIGN PATENT DOCUMENTS

| | | |
|---|---|---|
| GB | 768791 | 2/1957 |
| GB | 1083082 | 9/1967 |
| GB | 1251536 | 10/1971 |
| SU | 640882 | 1/1975 |

\* cited by examiner

*Primary Examiner* — Justin Holmes
*Assistant Examiner* — Jacob S Scott
(74) *Attorney, Agent, or Firm* — Lewis Kohn & Fitzwilliam LLP; David M. Kohn; Kari Moyer-Henry (57) ABSTRACT

The present invention relates to a braking system (1). The system comprises an annulus gear (3) having a fluid contained therein and at least one planet gear (4), arranged within the annulus gear and rotatably engaged therewith. The system further comprises means (10) for controlling the flow of fluid within the system to control relative rotational motion between the planet gear and the annulus gear.

14 Claims, 9 Drawing Sheets

BRAKING SYSTEM

CROSS REFERENCES

This application is a United States National Stage Application claiming priority under 35 U.S.C. 371 from International Patent Application No. PCT/EP2008/061643 filed Sep. 3, 2008, which claims the benefit of priority from European Patent Application Serial No. 07115671.5 filed Sep. 4, 2007, the entire contents of which are herein incorporated by reference.

FIELD OF THE INVENTION

The present invention relates to braking systems, and in particular, liquid resistance braking systems.

BACKGROUND TO THE INVENTION

Braking systems are employed in many areas of technology, including motor vehicles and various types of machinery. Friction brakes such as drum brakes or disc brakes are commonly used for slowing and stopping rotating shafts in vehicles and machinery. However, there are several disadvantages associated with friction braking. A particular disadvantage is the wear on the brake pads or shoes and discs, which are brought into contact to slow the rotary motion of the shaft by friction. A further disadvantage is the generation of heat by friction and also the need to remove that heat to avoid deformation.

Figure 1:
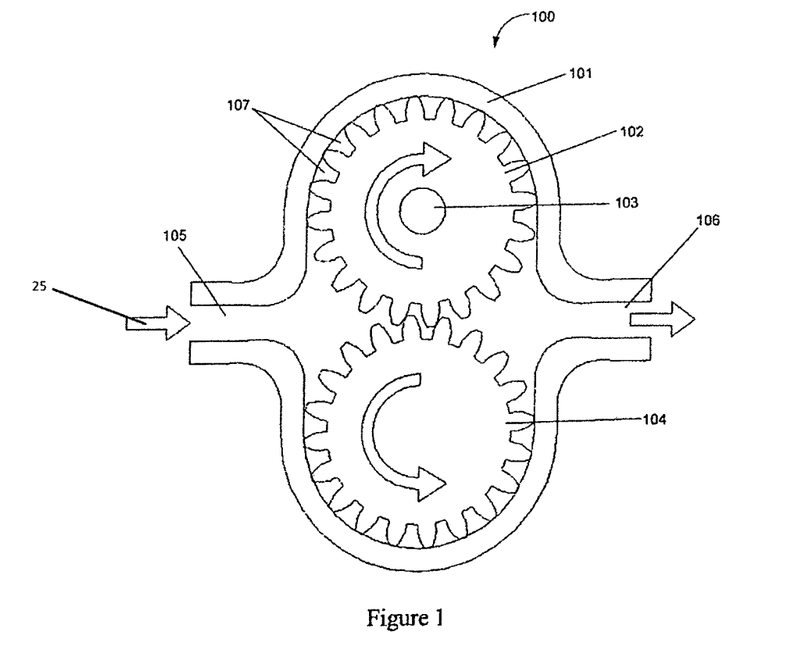
FIG. 1 is an elevation view of a simple gear pump.

Several other types of braking systems are also known. One type of braking system which does not rely on friction is a liquid resistance brake. This type of brake may be based on one or more gear pumps. A simple gear pump 100 is shown in FIG. 1 of the accompanying drawings. The gear pump comprises a driver gear 102 and an idle gear 104 arranged in a housing 101. Rotation of driver gear 102 by shaft 103 causes gear 104 to rotate. As the gears 102, 104 rotate they separate on the inlet side 105 of the pump 100. This creates an area of lower pressure on the inlet side 105, thereby drawing 25 fluid into the pump. The fluid is carried by the gears 102, 104 (in small volumes 107) to the outlet side 106, where the meshing of the gears displaces the fluid. Typically, the mechanical clearances in gear pumps are small to prevent the fluid from leaking backwards.

Liquid resistance brakes use the basic principle of a gear pump but with the inlet and outlet connected together through a valve. While the valve remains open, the shaft can freely turn, pumping fluid around the system. Once the valve is closed, the fluid pressure increases and restricts rotation of the gears and thus of the shaft.

Due to their non-friction operation, liquid resistance brakes are particularly suitable in applications where the maintenance costs of replacing worn brake pads are high or where heavy and constant wear makes brake pads too expensive to operate (such as in large sized vehicles like mining trucks). The non-friction operation is also of use in applications where heat generation or material distortion is a problem (such as in micro braking applications or explosive environments). Liquid resistance brakes are also suitable for regenerative braking applications where the excess energy generated during braking can be captured and reapplied to an alternative task (such as in regenerative braking systems used in light rail systems and next generation Formula One cars).

An example of this type of brake is described in U.S. Pat. No. 5,558,187. The apparatus comprises a fluid-tight housing in which is disposed a shaft rotational engagement gear having an exteriorly-accessible portion thereof rotatably engageable with a shaft. A plurality of compartments is formed with the housing and the compartments are in fluid communication with each other through openable and closable valves. The housing is substantially filled with a fluid which is flowable through the valves in direct relation to the openness of the valves. The apparatus further comprises a plurality of compartment-divider gears rotatably engaged with the shaft rotational gear and situated in cooperation with the compartment walls to create restriction seals between the compartments. When the valves are closed, the flow of fluid between the compartments is retarded and the fluid pressure is increased. The increased fluid pressure slows the gears which in turn slow the rotating shaft engaged with the rotational engagement gear, simultaneously decreasing fluid pressure.

A disadvantage of this system is that the brake will always be substantially larger in diameter than the shaft, resulting in an additional space requirement and an additional cost in terms of components.

It is desirable to provide a liquid resistance braking system which provides improved performance over known brakes of this type.

SUMMARY OF THE INVENTION

According to an aspect of the invention, there is provided a braking system, comprising:
an annulus gear having a fluid contained therein; at least one planet gear, arranged within the annulus gear and rotatably engaged therewith;
characterized in that it further comprises:
a divider arranged within the annulus gear to create at least one internal compartment, wherein the planet gear is arranged within the compartment; and
at least one channel provided in the divider; and
means for restricting the flow of fluid through the channel to control relative rotational motion between the planet gear and the annulus gear.

In one embodiment, the at least one planet gear is arranged within the compartment to divide the compartment into at least two portions. The each channel may be disposed between a first compartment portion and a second compartment portion and the fluid is flowable through the channel. The system may further comprise a valve disposed in the or each channel, wherein the valve is closeable to restrict the flow of fluid through the channel, thereby restricting relative rotational motion between the planet gears and the annulus gear.

According to an aspect of the invention, there is provided a braking system, comprising:
an annulus gear having a fluid contained therein;
at least one planet gear, arranged within the annulus gear and rotatably engaged therewith; and
means for restricting the flow of fluid within the system to control relative rotational motion between the planet gear and the annulus gear.

The means for restricting or controlling the flow of fluid within the system may comprise a valve, wherein the valve is closeable to restrict the flow of fluid within the system, thereby restricting relative rotational motion between the planet gears and the annulus gear.

The valve may be arranged between two sides of a planet gear, or between a pair of planet gears.

The system may further comprise a divider arranged within the annulus gear to create at least one internal compartment. The or each planet gear may be arranged within a compartment to divide the compartment into at least two portions. At least one channel may be provided in the divider, wherein the or each channel is disposed between a first compartment portion and a second compartment portion. The fluid is flowable through the channel. A valve may be disposed in the or each channel, wherein the valve is closeable to restrict the flow of fluid within the system, thereby restricting relative rotational motion between the planet gears and the annulus gear.

The braking system may comprise a pair of cover plates, which together with the annulus gear, provide a housing for the braking system. The housing is preferably fluid-tight. One plate may be connected to the annulus gear and the other plate to the divider and/or to the central axis of the or each planet gear. Thus, the central axis of the or each planet gear may be fixed relative to the divider. Alternatively, the planet gears may extend through one of the plates for direct connection to an element to which braking is to be applied. The cover plates may be rotatable relative to one another.

The each planet gear may be arranged within a compartment such that it is substantially flush with the wall of the compartment at least one point, thereby dividing the compartment into at least two portions.

The each channel may be disposed between two portions of a single compartment, or may be disposed between two portions of different compartments.

The braking system may include a plurality of planet gears, each planet gear arranged within a corresponding compartment and rotatably engaged with the annulus gear. The system may comprise a corresponding plurality of channels. In one embodiment, each channel is disposed between a pair of planet gears. Channels may be linked together to reduce the number of valves required. The number of planet gears and the size of those gears may be selected to optimize the desired performance of the braking system for a given set of operating parameters (torque, size, desired gear ratio etc.)

The braking system may be used to apply a braking force between a first rotatable element, such as a shaft, wheel, or conveyor belt, attached to the annulus gear and a second fixed element, such as a wall, vehicle chassis, or other fixed object, attached to the divider. Restricting flow of fluid within the system to restrict relative rotational motion between the planet gears and the annulus gear causes braking of the rotatable element. The arrangement may also be reversed, so that the annulus gear is attached to the fixed element and the divider is connected to the rotatable element.

The braking system may also be used to apply a force between two rotatable elements, for example, two shafts. In this arrangement, restricting flow of fluid in the system to restrict relative rotational motion between the planet gears and the annulus gear restricts rotation of the rotatable elements relative to one another, thus providing a driving engagement there between. The braking system thus provides relative braking between the two rotatable elements. For example, a first shaft may be rotatably driven by drive means, and a second shaft is coupled to the first shaft by the braking system of the present invention. Restricting the flow of fluid within the braking system restricts relative rotational motion between the first and second shafts, thereby causing rotation of the second shaft.

As set out above, the braking system of the present invention is a system for controlling, impeding or restricting relative rotational motion between two elements. The system may alternately be described as a rotational locking mechanism, a rotational coupling means or a rotational impedance device. The system may be used to stop rotational motion (by preventing relative rotational motion between a rotating element and a fixed element) or to cause rotational motion (by preventing relative rotational motion between a driven element and a driveable element). The braking system may be incorporated into a rotatable shaft, for example, a drive shaft.

The arrangement of the present invention has several advantages over known liquid resistance braking systems. For a given size of brake, the present invention will provide higher braking torque than the "external" braking system described in U.S. Pat. No. 5,558,187 and will therefore stop more quickly. The present invention therefore requires less space and involves a lower cost to achieve the required level of torque. In addition, because the planet gears are arranged within the annulus gear, the braking system may be provided within a shaft.

Furthermore, because the planet gears are arranged within the driven annulus gear, the entire system is enclosed within the outer gear. This allows an auxiliary friction braking system to be employed at the same position as, but external to the liquid resistance braking system of the invention.

In one arrangement, a first element, such as a rotatable shaft, wheel or conveyor belt, is connected to the annulus gear. Preferably, a cover plate is attached to the annulus gear and the first element is attached thereto. A second (fixed) element is connected to the divider. Preferably, a cover plate is attached to the divider and the second element is attached thereto. Restricting the flow of fluid within the system causes braking of the first element with respect to the second element. The first element may be connected directly to the annulus gear (or cover plate) or may be connected through at least one other gear to provide the desired rotational ratio or torque.

For example, the system may comprise a single planet gear disposed within a single compartment within the divider, dividing the compartment into two portions. A single channel in the divider connects the two compartment portions. A back cover plate may be connected to the central axis of the planet gear, so that the planet gear is free to rotate on this axis. The back plate is also connected to the divider and to a stationary element, for example, a wall. A front cover plate may be connected to the annulus gear and a rotatable shaft may be connected thereto. When the shaft rotates, the front plate and annulus gear also rotate, and the planet gear is in turn caused to rotate by means of engagement with the annulus gear. When the valve in the channel is closed, the flow of fluid through the channel is restricted, thereby restricting relative motion between the planet gear and the annulus gear, causing braking of the shaft.

In another arrangement, the first element is connected to the divider, preferably by attachment to a cover plate. The first element may be connected directly to the divider (or cover plate) or may be connected through at least one other gear to provide the desired rotational ration or torque.

In another arrangement, the first element is connected to a planet gear, preferably by attachment to a cover plate. The first element may be connected directly to the planet gear (or cover plate) or may be connected through at least one other gear to provide the desired rotational ratio or torque.

The braking system may also be used to connect two shafts together. A first shaft is connected to the annulus gear. Preferably, a cover plate is attached to the annulus gear and the first shaft is attached thereto. A second shaft is connected to the divider. Preferably, a cover plate is attached to the divider and the second shaft is attached thereto. Restricting the flow of fluid in the system, for example, by closing a valve, causes a driving engagement between the first and second shafts. When fluid is allowed to flow freely within the system, the planet gears can rotate and so the first and second shafts can rotate relative to one another.

According to various embodiments of the invention, fixed or rotatable elements may be connected to the planet gear or gears. The planet gear may be directly connected to an element, or its central axis may be attached to a cover plate which is in turn attached to the element. The divider and the planet gears may be connected to the same element.

The fluid contained in the braking system is preferably a substantially non-compressible hydraulic fluid. The fluid should preferably be able to withstand high pressure and temperature without vaporization. The fluid may be an oil.

The braking system may further comprise means for removing or inserting fluid to control the fluid pressure within the housing or for use in regenerative braking.

According to another aspect of the invention, there is provided a shaft comprising a braking system as described above.

BRIEF DESCRIPTION OF THE DRAWINGS

FIG. 8b is a perspective view of the divider, planet gears and back plate of the braking system of FIG. 8a;

FIG. 9b is a perspective view of the divider, planet gears and back plate of the braking system of FIG. 9a.

DETAILED DESCRIPTION OF THE DRAWINGS

Figure 2:
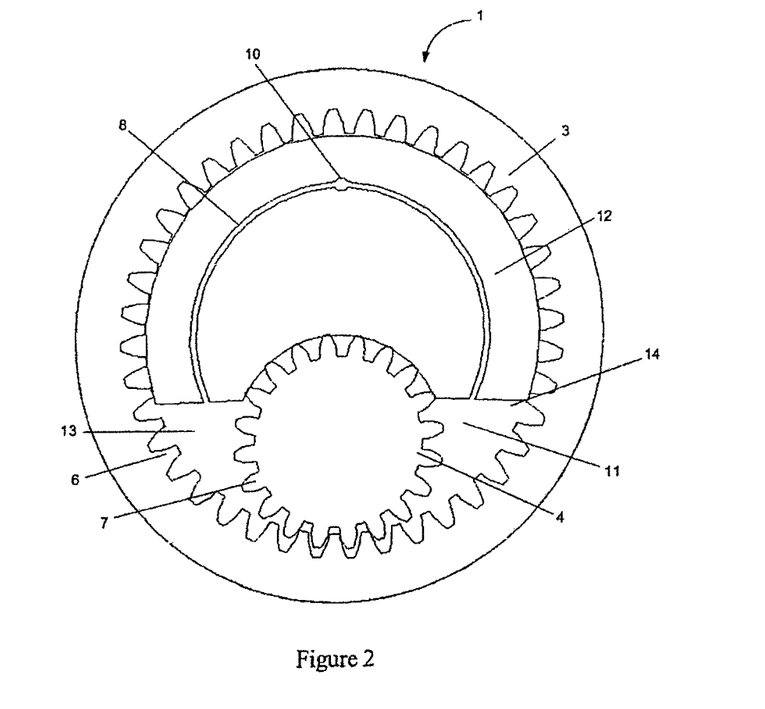
FIG. 2 is an elevation view of an embodiment of the braking system of the present invention with a single planet gear.

FIG. 2 shows an embodiment of a braking system 1 according to the present invention. The braking system comprises an annulus gear 3 connected to a front plate (not shown). The system also comprises a divider 12 arranged within the annulus gear to create an internal compartment 14. The divider 12 is connected to a back plate (not shown). The front and back plates, together with the annulus gear, form a housing for the braking system. The system also comprises a planet gear 4 rotatably engaged with the annulus gear 3 by means of interlocking teeth 6, 7 and arranged within the compartment 14 to divide the compartment into two portions 11, 13. The central axis of the planet gear is also connected to the back plate.

The braking system also includes a channel 8 formed in the divider 12. The channel 8 is disposed between the two portions 11, 13 of the compartment 14. A fluid is provided within the housing. The fluid is flowable through the channel 8. The braking system 1 further comprises a valve 10 disposed in the channel 8, wherein the valve 10 is closeable to restrict the flow of fluid through the channel.

With the valve 10 open, when the annulus gear 3 is driven in a clockwise direction (directly, or by connection to a shaft, pulley, wheel, belt or the like) the planet gear 2 is also rotated in a clockwise direction, because the planet gear 4 is engaged with the annulus gear by means of teeth 6, 7. The system effectively acts as a gear pump, such that a region of high fluid pressure is created on one side of the planet gear 4 in portion 11 of compartment 14 and a region of low fluid pressure is created on the other side of the planet gear in portion 13 of compartment 14. This pressure difference forces the fluid through the channel 8 from the high pressure region 11 to the lower pressure region 13. The fluid is therefore continuously circulated within the housing as the annulus gear 3 rotates.

When it is desired to stop or slow the annulus gear (and thus the shaft, pulley, wheel or belt to which the annulus gear is connected) the valve 10 is closed. The valve may be either fully or partially closed, depending on the degree of braking required. Closing the valve prevents (or restricts) the flow of fluid through the channel. The fluid pressure at region 11 is therefore increased. This increase in pressure prevents (or restricts) rotation of the planet gear 4, which in turn prevents (or restricts) rotation of the annulus gear 3, thereby resulting in stopping (or slowing) of the shaft or other element to which the annulus gear is connected.

Figure 3:
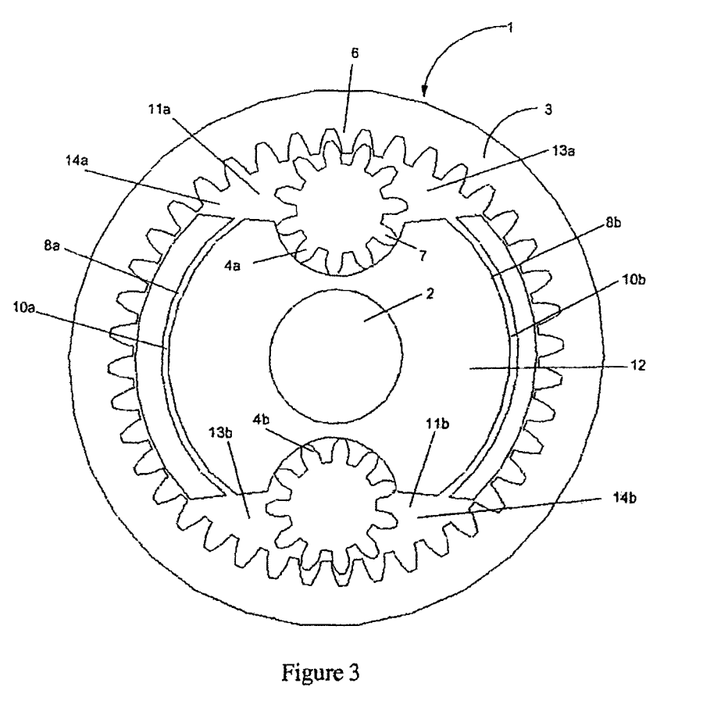
FIG. 3 is an elevation view of a second embodiment of the braking system of the present invention with two planet gears.
Figure 4:
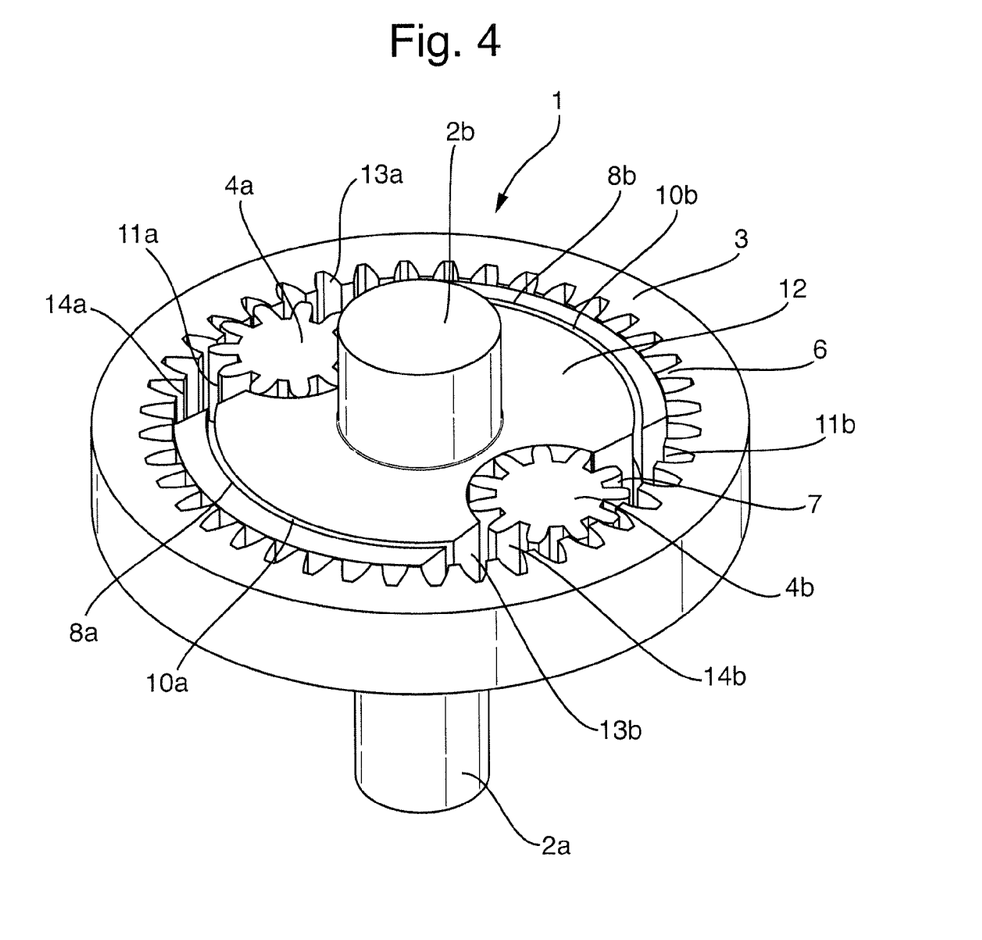
FIG. 4 is a perspective view of the embodiment of FIG. 3.

FIGS. 3 and 4 show a second embodiment of a braking system 1 according to the present invention. The braking system comprises an annulus gear 3, which forms part of the braking system housing. The annulus gear is connected to a first shaft 2a. The system further comprises a divider 12 arranged within the annulus gear 3 to create two internal compartments 14a, 14b. The divider 12 is connected to a second shaft 2b. The system 1 further comprises two planet gears 4a, 4b, each arranged within a respective compartment 14a, 14b. The planet gears 4a, 4b are rotatably engaged with the annulus gear by means of interlocking teeth 6, 7. The planet gears are free to rotate on their axes. The divider and the central axes of the planet gears are linked, for example by a cover plate (not shown).

The braking system also includes two channels 8a, 8b formed in the divider 12. Each channel 8a, 8b is disposed between the two compartments 14a, 14b. A fluid is provided within the housing. The fluid is flowable through the channels 8. The braking system 1 further comprises a valve 10a, 10b disposed in each channel, wherein the valves 10 are closeable to restrict the flow of fluid through the respective channel.

With the valves 10 open, when the rotatable shaft 2a is driven in a clockwise direction, the annulus gear also rotates in a clockwise direction. If the shaft 2b is held fixed, the planet gears 4 also rotate on their axes in a clockwise direction because they are engaged with the annulus gear by means of teeth 6, 7. The system effectively acts as a pair of gear pumps, such that a region of high fluid pressure 11a, 11b is created on one side of each planet gear 4a, 4b, forcing the fluid through the channels 8a and 8b from the high pressure regions 11a, 11b to regions of lower pressure 13a, 13b. The fluid is therefore continuously circulated within the housing as the shaft 2a rotates.

When it is desired to stop or slow the shaft 2a, the valves 10 are closed. The valves may be either fully or partially closed, depending on the degree of braking required. Closing the valves prevents (or restricts) the flow of fluid through the channels. The fluid pressure at regions 11a and 11b is therefore increased. This increase in pressure prevents (or restricts) rotation of the planet gears 4, which in turn prevents (or restricts) rotation of the annulus gear 3, thereby resulting in stopping (or slowing) of rotation of the attached shaft 2a.

Figure 5:
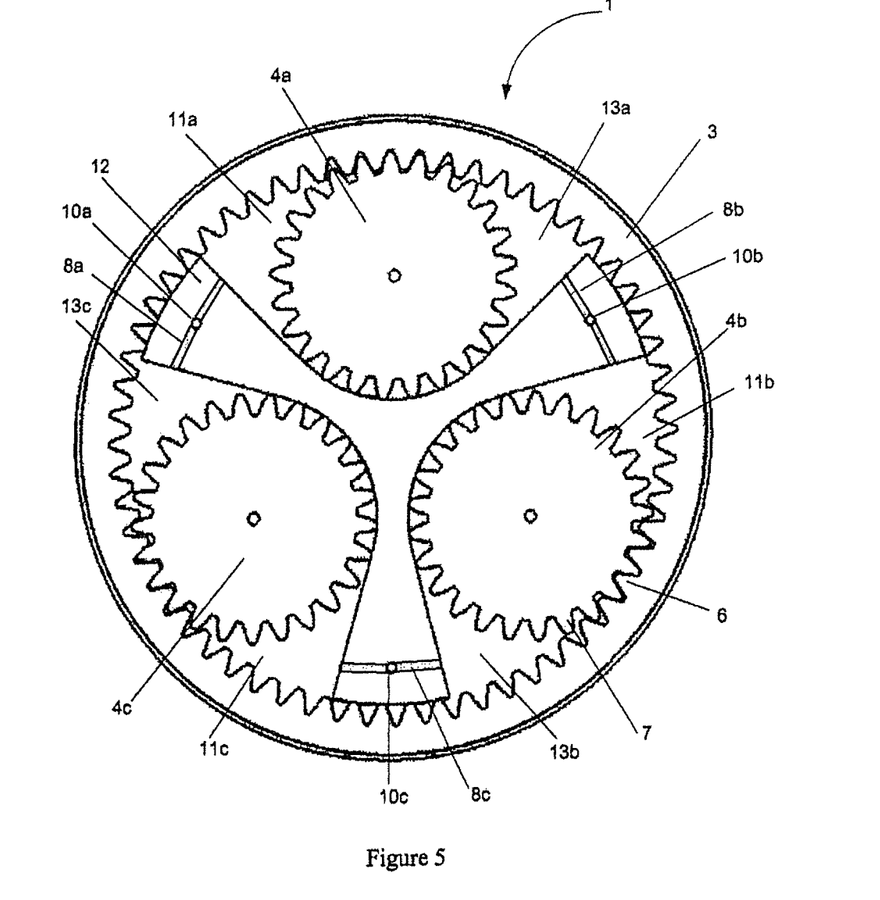
FIG. 5 is an elevation view of a third embodiment of the braking system of the present invention.
Figure 6:
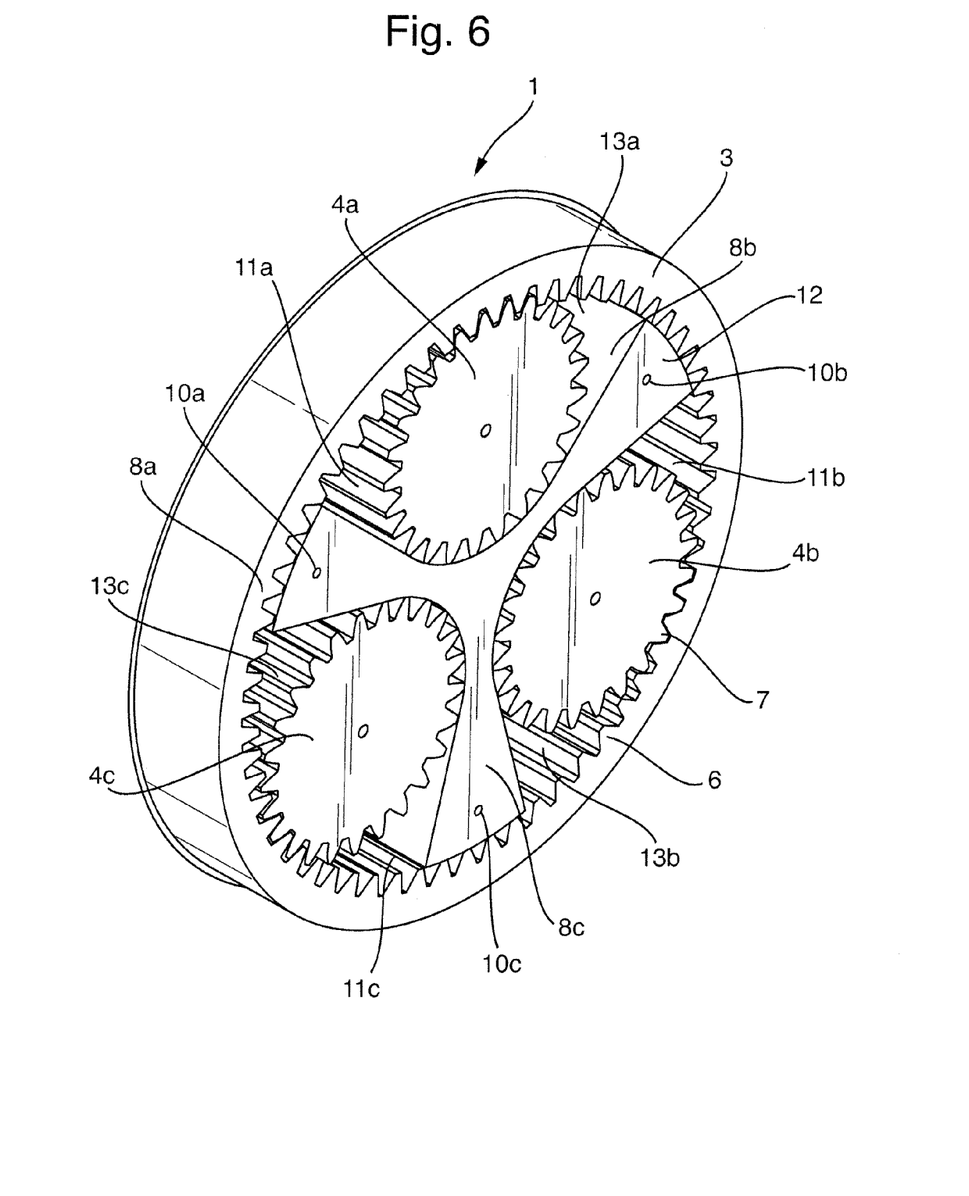
FIG. 6 is a perspective view of the embodiment of FIG. 5.

FIGS. 5 and 6 show a third embodiment of a braking system 1. The braking system comprises an annulus gear 3. The annulus gear forms part of a housing for the braking system. The system 1 further comprises three driven planet gears 4a, 4b, 4c arranged within the annulus gear 3. The planet gears 4a, 4b, 4c are rotatably engaged with the annulus gear by means of interlocking teeth 6, 7. The system further comprises a divider 12 arranged within the annulus gear 3 to create an internal compartment 14a, 14b, 14c for each planet gear 4a, 4b, 4c. Each planet gear 4 is arranged within a compartment 14 to divide the compartment into two portions 11a, b, c, 13a, b, c. The planet gears 4 are free to rotate on their axes. The divider is linked to the central axes of the planet gears, for example by means of a cover plate (not shown). One or more elements, such as a rotatable shaft, a pulley or a belt may be connected to the annulus gear, the divider, or a planet gear, for example, by means of front and back cover plates forming part of the housing of the braking system.

The braking system also includes three channels 8a, 8b, 8c formed in the divider 12. As in the embodiment shown in FIGS. 3 and 4, each channel 8a, 8b, 8c is disposed 15 between a pair of planet gears 4a, 4b, 4c. A fluid is provided within the housing. The fluid is flowable through the channels 8. The braking system 1 further comprises a valve 10a, 10b, 10c disposed in each channel, wherein the valve 10 is closeable to restrict the flow of fluid through the respective channel.

Operation of the braking system shown in FIGS. 5 and 6 is substantially as described above with reference to FIG. 2 or FIGS. 3 and 4, depending on whether the rotatable shaft is connected to the annulus gear 3, the divider 12 or a planet gear 4.

Figure 7A:
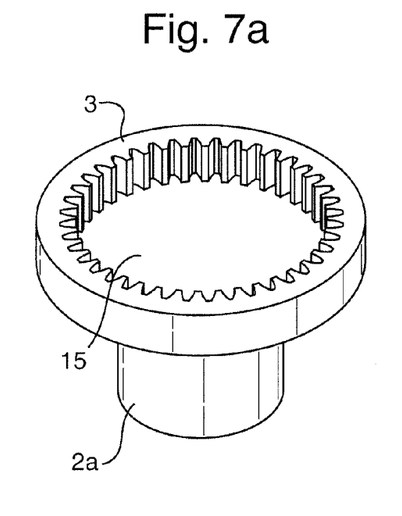
FIG. 7a is a perspective view of the annulus gear and front plate of a braking system according to the present invention connected to a first shaft.
Figure 7B:
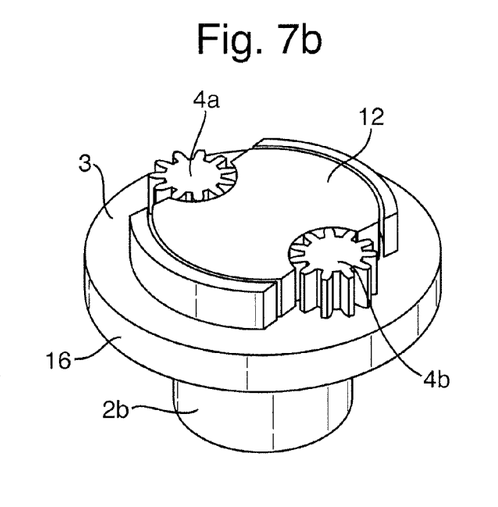
FIG. 7b is a perspective view of the divider, planet gears and back plate of the braking system of FIG. 7a, connected to a second shaft.
Figure 7C:
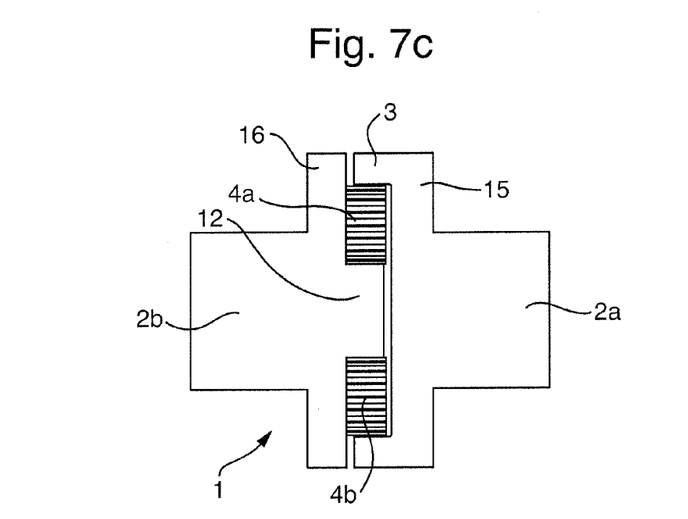
FIG. 7c is a cross-sectional view of the braking system of FIGS. 7a and 7b.

Another arrangement of the braking system of the present invention is shown in FIG. 7, in which the braking system is used to connect two shafts 2a, 2b together. As shown in FIGS. 7a and 7b, the first shaft 2a is connected to the front plate 15 of the braking system and thus to the annulus gear 3. The second shaft 2b is connected to the back plate 16 and thus to the divider 12. The central axes of the planet gears 4a, 4b are also connected to back plate 16. The braking system 1 operates substantially as described above with reference to the other drawings. Closing the valves 10 to restrict relative rotational motion between the planet gears 4a, 4b and the annulus gear 3 causes a driving engagement between the first and second shafts 2a, 2b. When the valves 10 are open, the planet gears 4 can rotate and so the first and second shafts 2a, 2b can rotate relative to one another. This type of system may be used to couple a driven shaft to a drivable shaft. For example, if shaft 2a is rotatably driven by a drive means, closing the valves 10 will restrict relative rotational motion between shaft 2a and shaft 2b, thereby causing shaft 2b to rotate with shaft 2a. This type of system may also be used as a variable torque delivery system or as a safety disengagement system.

Figure 8A:
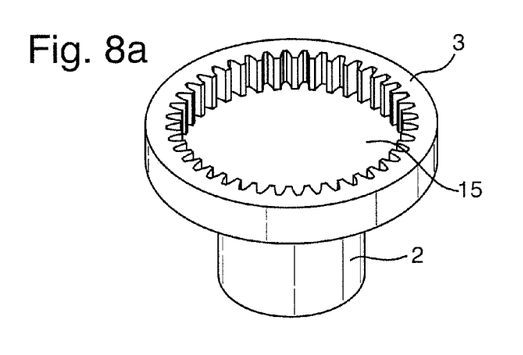
FIG. 8a is a perspective view of the annulus gear and front plate of a braking system according to the present invention connected to a shaft.
Figure 8B:
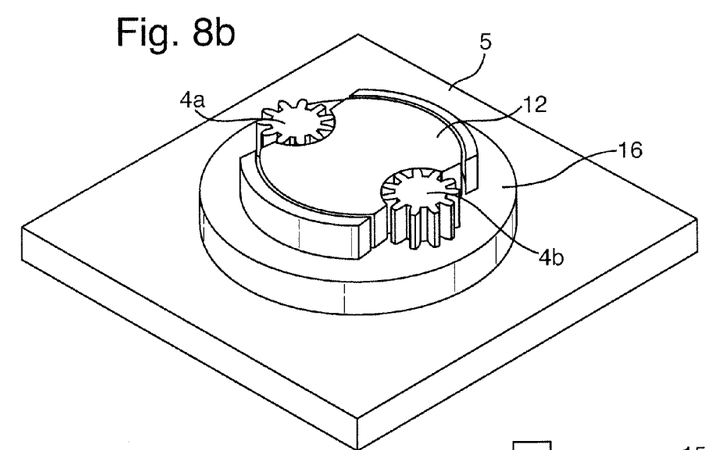
Figure 8C:
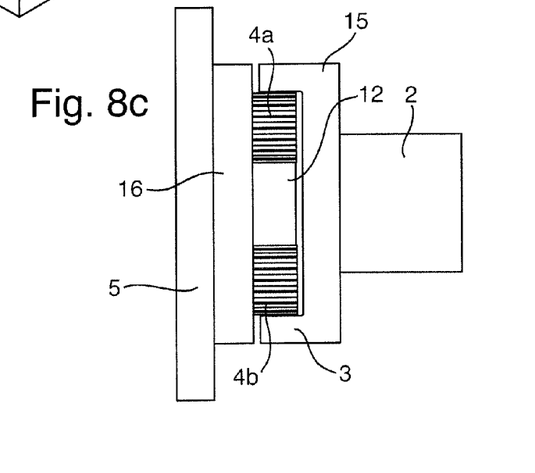
FIG. 8c is a cross-sectional view of the braking system of FIGS. 8a and 8b.

Another arrangement is shown in FIG. 8. This arrangement is similar to that shown in FIG. 7 except that the back plate 16 is connected to a fixed object, such as a wall 5, instead of a shaft. In this arrangement, closing the valves to restrict relative rotational motion between the planet gears 4 and the annulus gear 3 causes the shaft 2 to brake. When the valves are open, the planet gears can rotate and the shaft is also free to rotate. Such a system may be used to provide variable braking to the shaft.

Figure 9A:
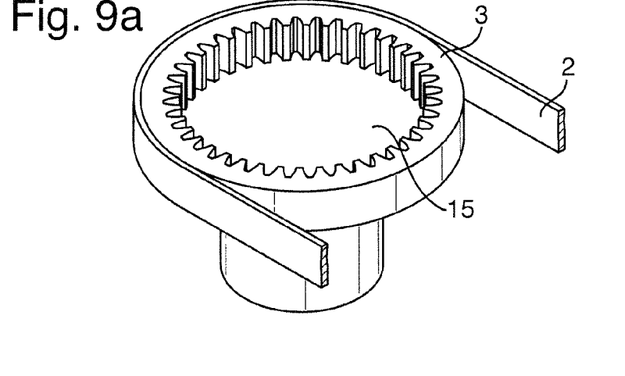
FIG. 9a is a perspective view of the annulus gear and front plate of a braking system according to the present invention connected to a belt.
Figure 9B:
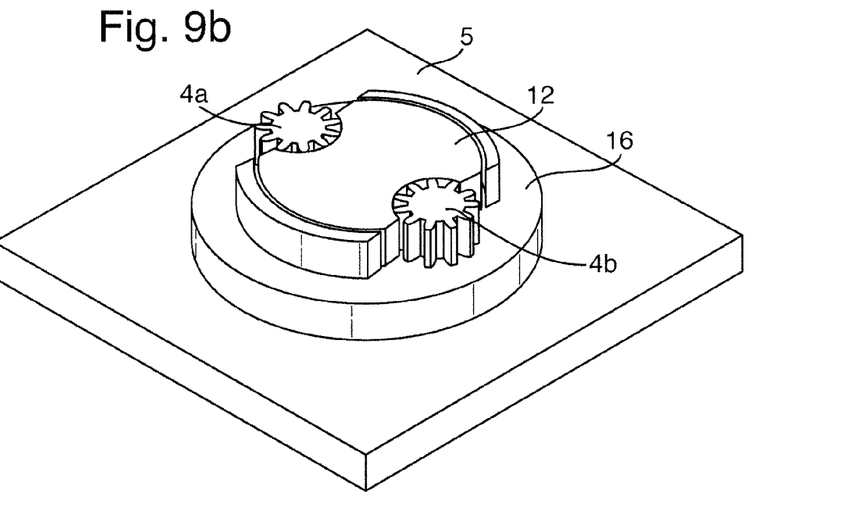
Figure 9C:
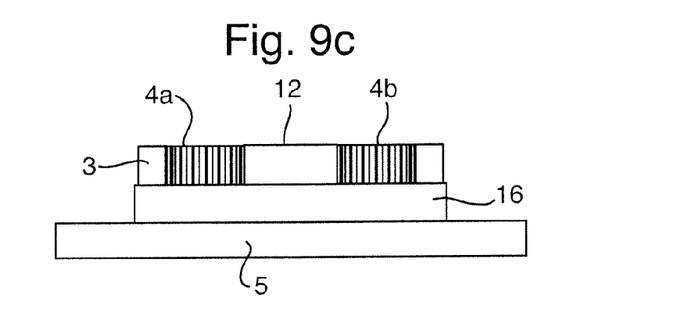
FIG. 9c is a cross-sectional view of the braking system of FIGS. 9a and 9b.

Another arrangement is shown in FIG. 9. This arrangement is similar to that shown in FIG. 8, except that the annulus gear is driven by a belt 2 instead of a shaft. The operation of the system us is otherwise the same as described above for FIG. 8.

The words "comprises/comprising" and the words "having/including" when used herein with reference to the present invention are used to specify the presence of stated features, integers, steps or components but does not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The invention claimed is:

1. A braking system, comprising:
    an annulus gear having a fluid contained therein;
    at least one planet gear, enclosed within the annulus gear and rotatably engaged therewith;
    a divider enclosed within the annulus gear to create at least one internal compartment, wherein the planet gear is arranged within the compartment; and
    at least one channel provided in the divider; and
    means for restricting the flow of fluid through the channel to control relative rotational motion between the at least one planet gear and the annulus gear.

2. The braking system of claim 1, wherein:
    the at least one planet gear is arranged within the compartment to divide the compartment into at least two portions; and
    the channel is disposed between a first compartment portion and a second compartment portion; and
    the fluid is flowable through the channel; and
    further comprising a valve disposed in the channel, wherein the valve is closeable to restrict the flow of fluid through the channel, thereby restricting relative rotational motion between the planet gears and the annulus gear.

3. The braking system of claim 1, wherein the means for restricting the flow of fluid within the system comprises a valve, wherein the valve is closable to restrict the flow of fluid within the system, thereby restricting relative rotational motion between the planet gears and the annulus gear.

4. The braking system of claim 1, further comprising a pair of cover plates, wherein the cover plates and the annulus gear together provide a housing for the braking system.

5. The braking system of claim 2, wherein the valve is arranged between two sides of a planet gear, or between a pair of planet gears.

6. The braking system of claim 4, wherein one cover plate is connected to the annulus gear and the other cover plate is connected to the divider or to the central axis of the planet gear.

7. The braking system of claim 1, wherein the channel is disposed between two portions of a single compartment.

8. The braking system of claim 1, wherein the channel is disposed between a portion of a first compartment and a portion of a second compartment.

9. The braking system of claim 1, wherein the planet gear is arranged within a compartment such that it is substantially flush with the wall of the compartment at at least one point, thereby dividing the compartment into at least two portions.

10. The braking system of claim 1, comprising a plurality of planet gears, each arranged within the annulus gear and rotatably engaged therewith, and a corresponding plurality of channels.

11. The braking system of claim 8, wherein each channel is disposed between a pair of planet gears.

12. The braking system of claim 1, further comprising means for removing or inserting fluid to control the fluid pressure within the housing or for use in regenerative braking.

13. The braking system of claim 1, further comprising a secondary braking system for applying a braking force directly to the annulus gear or to one of the cover plates.

14. The braking system of claim 1, further comprising a shaft.

* * * * *